United States Patent [19]

Murakami et al.

[11] Patent Number: 4,725,905
[45] Date of Patent: Feb. 16, 1988

[54] MAGNETIC DISK DRIVING DEVICE

[75] Inventors: Keisuke Murakami; Masayosi Kawahira; Chihiro Aoki, all of Shizuoka, Japan

[73] Assignee: Tokyo Electric Co., Ltd., Tokyo, Japan

[21] Appl. No.: 836,061

[22] Filed: Mar. 4, 1986

[30] Foreign Application Priority Data

Mar. 8, 1985 [JP] Japan ................... 60-46141

[51] Int. Cl.⁴ ............................................. G11B 17/032
[52] U.S. Cl. .................................................. 360/97
[58] Field of Search ................ 360/97, 99; 369/270

[56] References Cited

U.S. PATENT DOCUMENTS 4,466,032 8/1984 Saito ........................ 360/99

FOREIGN PATENT DOCUMENTS 59-218681 12/1984 Japan ................... 360/97

Primary Examiner—Robert S. Tupper
Attorney, Agent, or Firm—Oblon, Fisher, Spivak, McClelland & Maier

[57] ABSTRACT

A magnetic disk driving device in which, by closure of an outer cover, a magnetic disk is press-fitted on a spindle by push members without producing any play and the rotating surface of the magnetic disk is fixed by a regulating member. By clamping of the outer cover, which is effected when the outer cover has reached the position closest to a base and then slightly retreated therefrom, the push members are separated from the magnetic disk by means of relative movement of the outer cover and a plate with the positional relationship between the magnetic disk and the regulating member kept as it is.

5 Claims, 8 Drawing Figures

MAGNETIC DISK DRIVING DEVICE

FIELD OF THE INVENTION AND RELATED ART STATEMENT

The present invention relates to a magnetic recording and reproducing apparatus in which a magnetic head is shifted radially with reference to a magnetic disk contained in a hard case for making magnetic record and reproduction and more particularly to a magnetic disk driving device for driving the disk in the hard case to rotate.

As a magnetic recording and reproducing apparatus, there has been in use one wherein a disk supporting member, called a diskette base or basket, for supporting a magnetic disk and an outer cover for covering the disk supporting member are rotatably attached to a base having a spindle and a magnetic head thereon and the magnetic disk is adapted to be loaded onto the spindle when the disk supporting member and the outer cover are closed. In the above described structure while the magnetic disk is driven to rotate by the spindle, the magnetic head is shifted radially with reference to the magnetic disk thereby to process data.

In the apparatus as described above, there are required to be installed a push member for pushing the center portion of the magnetic disk toward the spindle and a regulating member for pressing the magnetic disk to the magnetic head. The push member is required for the reason that the magnetic disk must be put on the spindle in tight engagement therewith and the regulating member is required for the reason that reliable processing of data cannot be achieved if the condition of contact between the rotating surface and the magnetic head is unsteady. In addition, it is necessary that the regulating member and push member are detached from the magnetic disk when the outer cover and disk supporting member are rotated in their opening direction.

Problems with such prior art were as follows. The push member and the regulating member were fitted to different supporting members, and so, when the outer cover was being opened, it was required that these supporting members be interlinked during separating from the magnetic disk. The adjustments of operating timing for various parts to have such operation performed were difficult, and hence, pertinent structure and assembly work thereof were complex and a large number of parts were required.

OBJECT AND SUMMARY OF THE INVENTION

A first object of the invention is to obtain a simplified magnetic disk driving device structure able to push the magnetic disk to the side of the spindle and to simultaneously fix the rotating surface of the magnetic disk.

A second object of the invention is to obtain a simplified magnetic disk driving device structure able to make a push member first push the center portion of the magnetic disk to the side of the spindle and then make the push member separate from the magnetic disk.

A third object of the invention is to obtain a magnetic disk driving device operation reliably able to make the push member push the magnetic disk to the side of the spindle and at the same time to have the rotating surface of the magnetic disk fixed, and further made the push member separate from the magnetic disk.

A fourth object of the invention is to obtain a magnetic disk driving device with a fewer number of parts.

In the present invention, a disk supporting member and an outer cover are rotatably attached to a base having a spindle and a magnetic head thereon, a clamp mechanism is provided on the base, the clamp mechanism clamping the outer cover in the position wherein the outer cover has been slightly returned from a position, after the outer cover has reached there by being rotated, in the closest distance to the base, a plate supporting a regulating member thereon is movably attached to the interior of the outer cover being urged by an elastic member toward the side of the base, plate supports for supporting the plate are provided on the base, push members supported by a plate spring are provided on the plate, and a spring support is provided on the interior of the outer cover for pushing the plate spring to cause the push members to push the center portion of the magnetic disk at the time when the rotated outer cover has reached the position of closest distance to the base and to cause the push member to separate from the magnetic disk at the time when the outer cover is clamped.

And, when the disk supporting member with a magnetic disk loaded thereon and the outer cover are rotated toward the side of the base as far as the maximum limit, the plate is adapted to be supported by the plate supports, whereby the plate spring pushed by the spring support is bent so that the push members are caused to push the center portion of the magnetic disk. Thus, the center portion of the magnetic disk is certainly press-fitted on the spindle. Simultaneously, the rotating surface of the magnetic disk is fixed by the regulating member. And, when the outer cover is clamped by the clamp mechanism, the spring support slightly retreats from the plate spring with the positional relationship between the magnetic disk and the clamp kept as it is, and the push member is thereby separated from the magnetic disk.

The movement of the push members to push the magnetic disk and, when the outer cover is clamped, to separate from the magnetic disk and that of the regulating member to fix the rotating surface of the magnetic disk are achieved only by means of relative motion between the outer cover and the single plate. Therefore, the structure for such movements can be simplified and hence the assembling work thereof can be made easier. Since the operation therefor is only to rotate the outer cover to the maximum limit and then allow the outer cover to be clamped, the operability is made better. Besides, the number of parts can be reduced.

DETAILED DESCRIPTION OF THE PREFERRED EMBODIMENT

Figure 1:
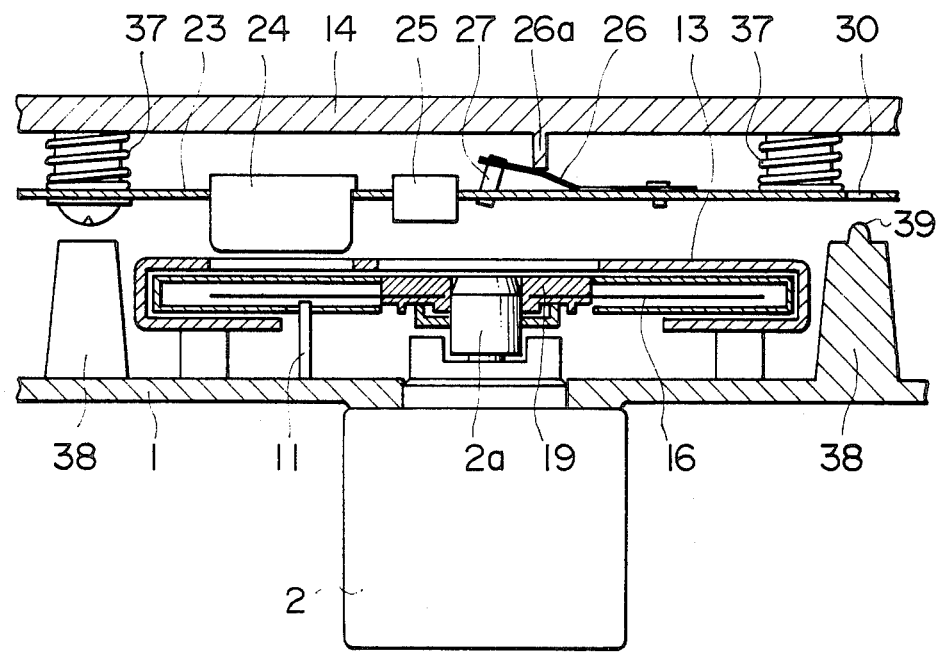
FIG. 1 is a partially enlarged vertical cross-sectional front view of an embodiment of the present invention wherein interlocked operation of a magnetic disk to be connected to a spindle following the closing motion of the outer cover is shown.

A preferred embodiment of the present invention will be described below referring to the accompanying drawings, wherein 1 denotes a base provided thereon with a spindle 2a directly coupled with a spindle motor 2. At a side of the base 1 there are provided a gear 3, directly coupled with a step motor (not shown), and a segment gear 4 in engagement with each other. A rack 6 in engagement with a gear 5 integrally rotating with the segment gear 4 constitutes a part of a carrier 8 traveling along a carrier shaft 7. A head mounting plate 9 attached to the carrier 8 through a connecting plate 8a is provided with an adjustment screw 10 fitted thereon for rotatable, but not axial movement, the adjustment screw being arranged perpendicularly to the carrier shaft 7. The adjustment screw 10 is threaded with a head base 12 constituting a portion of a magnetic head 11.

To the base 1 are rotatably fitted a disk supporting member 13 and an outer cover 14 through a support shaft 15. By use of the disk supporting member 13, a hard case 17 containing a magnetic disk 16 is removably supported. The magnetic disk 16 is provided with a flange 19 with a connecting hole 18 for connection with the spindle 2a made in the center portion thereof. On the right side of the hard case 17 there is provided a shutter 20 for exposing a portion of the magnetic disk 16 operably attached to the right side periphery thereof for sliding along the same, and there is also provided an outwardly urged lock claw 21 for locking the movement of the shutter 20 operably attached to the same. On the right side of the disk supporting member 13 there are provided an engagement portion (not shown) to cause the lock claw 21 to retreat inward when the hard case 17 is inserted thereby to open the shutter 20 and a wire 22 to be put in engagemen with the shutter 20.

On a plate 23 formed substantially in a triangular shape, there is provided fixed thereto a regulating member 24 opposing to the magnetic head 11 and there are also provided an index sensor 25 fixed thereto opposite a magnetic member (not shown) formed in a minimum dot shape on the magnetic disk 16 slightly apart from the center thereof and two push members 27 in the form of pins supported by a plate spring 26 and urged toward the side of the outer cover 14. Each plate spring 26 is urged to separate from the plate 23 by its own spring force but is supported by a spring support 26a formed on the interior of the outer cover 14. In the plate 23, there are made two engagement holes 28, openings 28a, 29 and two positioning holes 30. On the outer cover 14, there are provided two bosses 31 slidably fitting in the engagement holes 28, a boss 32 opposing the hole 28a, and a window 33. Further, on the interior of the outer cover 14, there ar provided three bosses 34 one of which is to stick out from the hole 29 and the other two are to be disposed outside the outer edges of the plate 23, and these bosses 34 are provided with springs 35 pressed therein. The plate 23 is operably supported for displacement toward the side of the base 1 with its one side engaged with the window 33 and its engagement holes 28 filled by screws 36, the screws 36 being threaded in the bosses 31. And, the plate 23 is urged toward the side of the base 1 by means of springs 37 as elastic members put on the periphery of the bosses 31.

On the base 1, there are set up three plate supports 38 for supporting the plate 23, and on the top of the two of these plate supports 38, there are formed protrusions 39 to be put in engagement with the positioning holes 30 in the plate 23. On the base 1, there are also set up a pin 41 to be engaged with a hole 40 made in the hard case 17 and a pin 42 to support the bottom face of the hard case 17. And, a clamp shaft 51 disposed on the base 1 is provided at its right end fixed thereto with a clamp claw 43 and on the left end fixed thereto with a clamp claw 44 having a handle 44a. On both sides of the outer cover 14, there are provided integrally formed therewith protruded pieces 45 to engage with the clamp claws 43, 44. On the left-hand side of the base 1, there is operably provided a hook 46 for rotation around a shaft 47, which hook 46 is adapted to cause the clamp claw 44 to retreat from the protruded piece 45. And there is stretched a spring 48 between the hook 46 and the clamp claw 44. On the left-hand side of the outer cover 14, there is formed a protruded piece 49 which is adapted to abut against the hook 46. Thus, a clamp mechanism 50 is made up of the clamp shaft 51, clamp claws 43, 44 and the hook 46.

Within the above described arrangement, the clamp claw 44 is urged to the direction to cause locking by the spring 48. The support shaft 15 is provided around the same with a torsion spring (not shown) for urging the same to its opening direction. The disk supporting member 13 is provided with empty spaces at places so as not to interfere with elements such as the spindle 2a, magnetic head 11, regulating member 24, index sensor 25, push members 27 and springs 35.

With the structure as described above, the shutter 20, in the process of insertion of the hard case 17 into the disk supporting member 13, is caused to slide backward by means of the engagement portion on the right of the disk supporting member 13, whereby a portion of the magnetic disk 16 is exposed to the magnetic head 11 and the regulating member 24.

Figure 2:
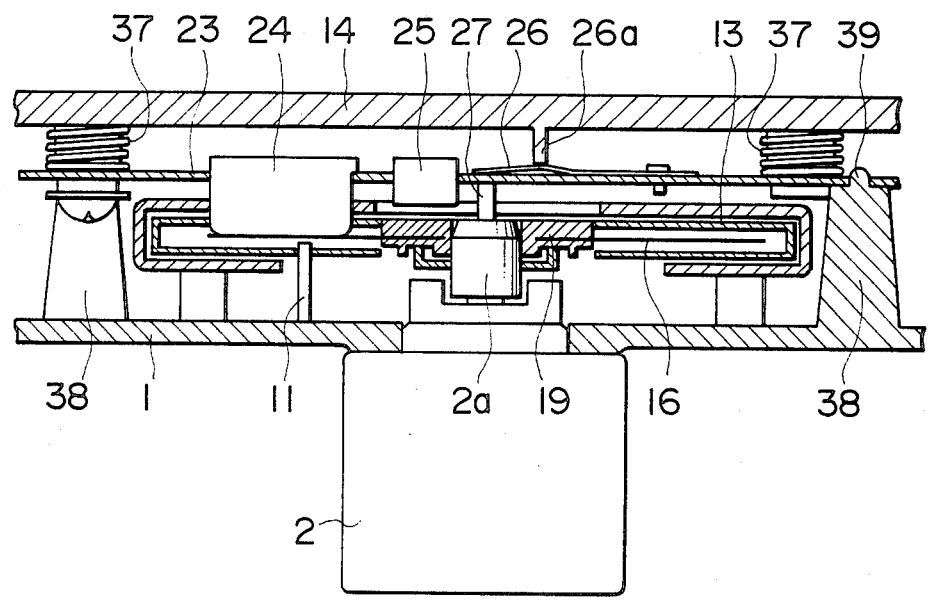
FIG. 2 is a partially enlarged vertical cross-sectional front view of the same in another state.
Figure 3:
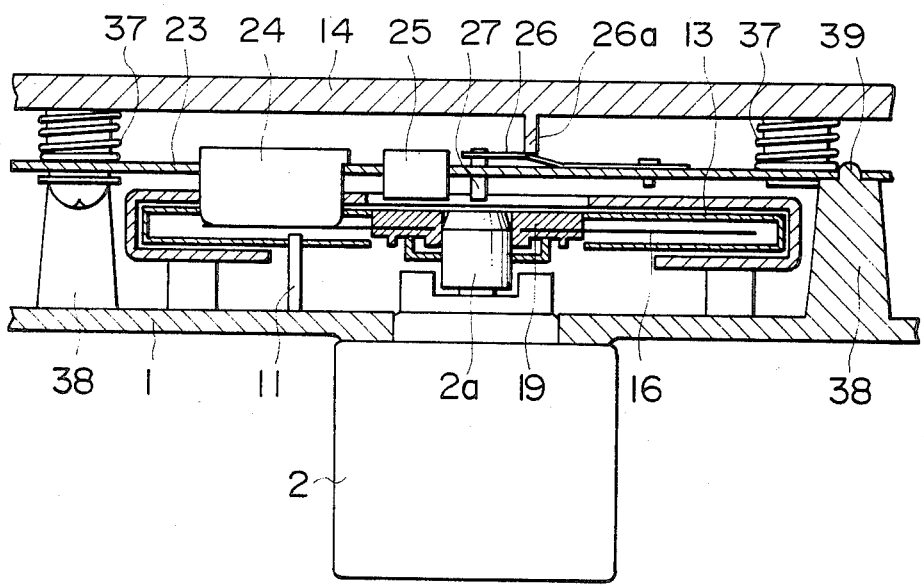
FIG. 3 is a partially enlarged vertical cross-sectional front view of the same in still another state.
Figure 4:
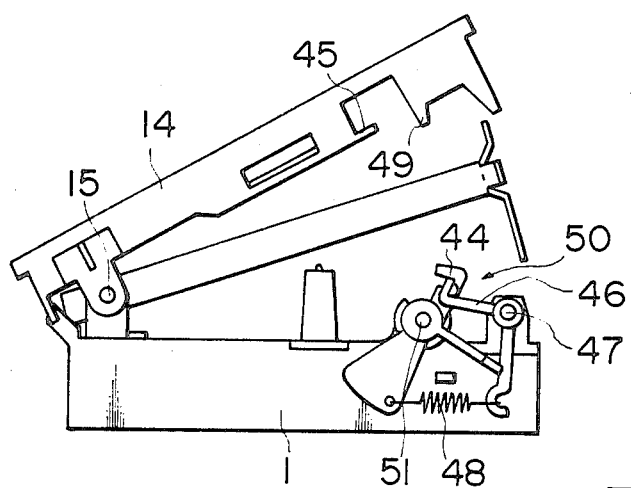
FIG. 4 is a side view showing operation of a clamp mechanism.
Figure 5:
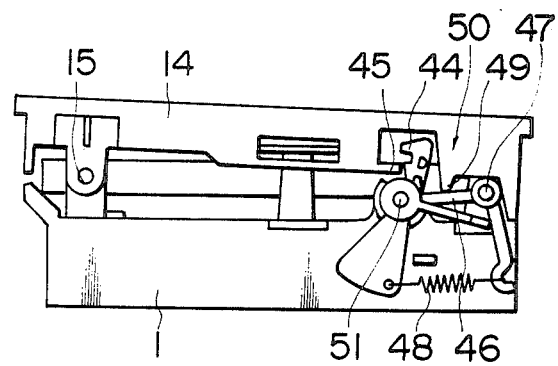
FIG. 5 is a side view showing the same in another state.
Figure 6:
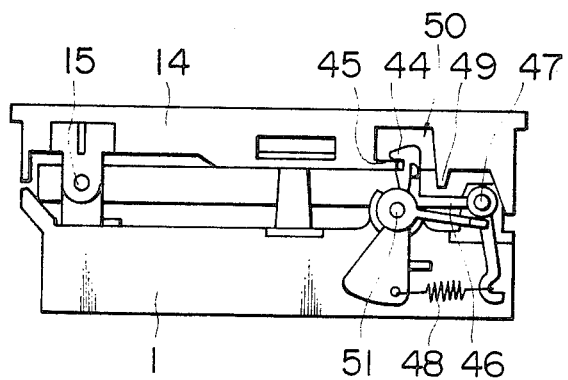
FIG. 6 is a side view showing the same in still another state.

Now, the closing operation of the outer cover 14 will be described. FIGS. 1 and 4 show the apparatus in the state where the outer cover 14 is opened. The plate 23 there is positioned at a large distance from the interior of the outer cover 14 by means of the pressure of the springs 37, and the plate spring 26 is raised up from the plate 23. FIGS. 2 and 5 show the apparatus in the state where the outer cover 14 has been rotated toward the side of the base 1 to the maximum limit, whereby the hook 46 is pushed by the protruded piece 49 and the clamp claw 44 is released from the hook 46. In the meantime, the plate 23 is supported by the plate supports 38 and the plate spring 26 is bent by being pushed by the spring support 26a, and thereby the push members 27 are caused to push on the flange 19 of the magnetic disk 16. Thus the magnetic disk 16 is firmly press-fitted on the spindle 2a without producing any play. FIGS. 3 and 6 show the apparatus in the state where the outer cover 14 is released from the press of a hand. In this state, the outer cover 14 has been slightly retreated from the position closest to the base 1 by means of the pressure of the springs 37 and clamped by the clamp claws 44, 43. And, by a slight retreat of the spring support 26a from the plate 23, the plate spring 26 is slightly raised from the plate 23 and the push members 27 are separated from the magnetic disk 16.

Thereupon, the magnetic disk 16 is rotated by the spindle motor 2 through the spindle 2a and the magnetic head 11 is shifted radially with reference to the magnetic disk 16 being carried by the carrier 8 which is driven by driving force from rotation of the step motor transmitted through gears 3, 4, and 5 and the rack 6, and thus data are processed. At this time, since the center portion of the magnetic disk 16 is firmly press-fitted on the spindle 2a, a correct track search is ensured. And, since the push members 27 have been retracted and the rotating surface of the magnetic disk is kept from the hard case 17 by being regulated by the regulating member 24, the magnetic disk 16 is assured of making smooth rotation.

Figure 7:
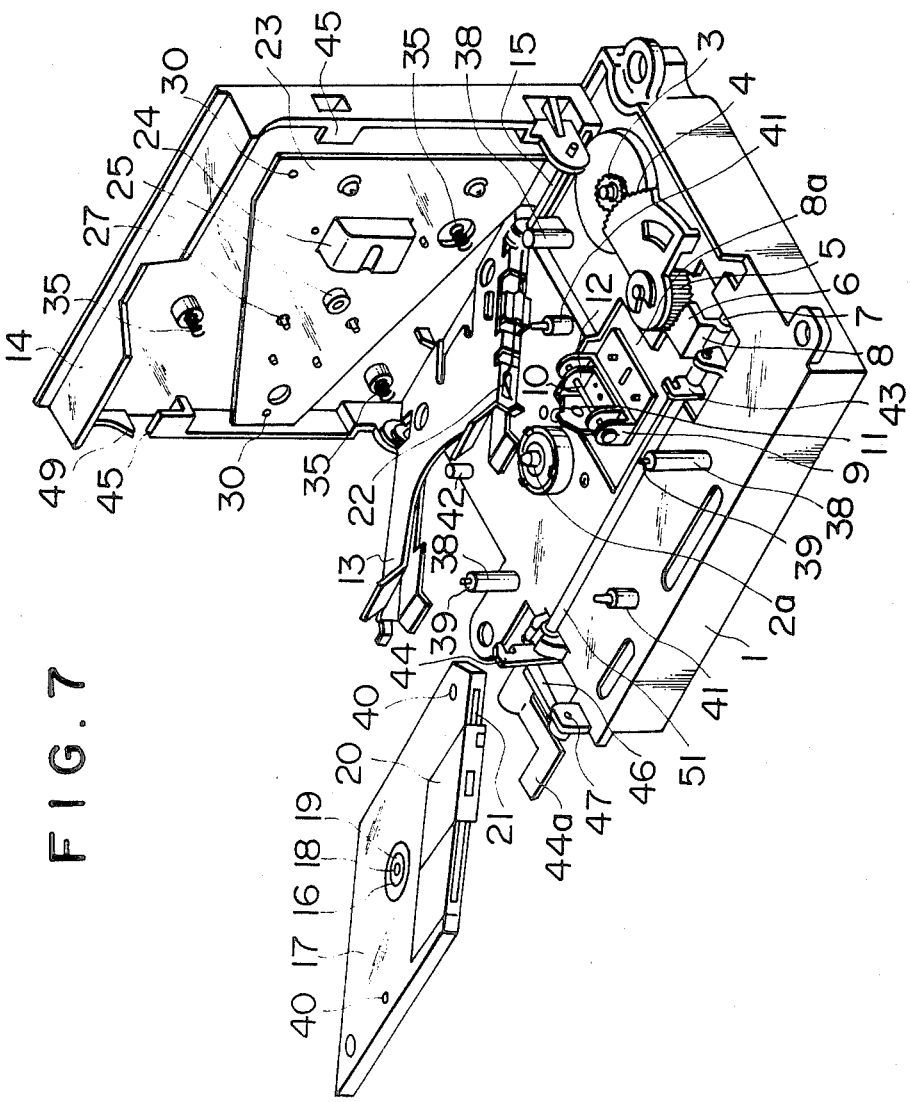
FIG. 7 is a perspective view of the whole body.
Figure 8:
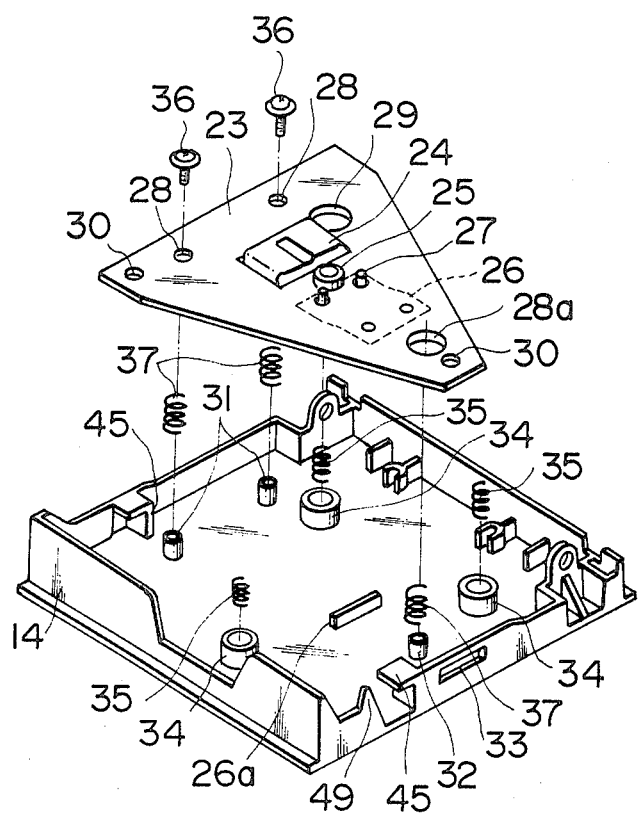
FIG. 8 is an exploded perspective view showing the state of fitting of a plate to an outer cover.

When taking out the hard case 17, the handle 44a is pressed to rotate the clamp claws 43, 44. Thereby, the outer cover 14 is rotated in its opening direction by means of the spring force of the torsion spring and, interlinked with this motion, the disk supporting member 13 is rotated in the direction to be released. In FIG. 7, in order to indicate the internal arrangement, the angle of rotation of the outer cover 14 is illustrated wider than reality. In reality, the same is as narrow as illustrated in FIG. 4.

According to the present embodiment, as described above, the operation to push the magnetic disk 16 by means of the push members 27 against the spindle 2a so that the same is press-fitted on the spindle 2a without producing any play and the operation to fix the rotating surface of the magnetic disk 16 by means of the regulating member 24 are performed by relative movement between the outer cover 14 and the single plate 23. Besides, since the outer cover 14 and the plate 23 are connected through springs 37, strict accuracy is not required in the positioning of both the members.

Therefore, they can be arranged in simpler structure and assembled by simplified work. At the time of the clamping of the outer cover 14, the operation to separate the push members 27 from the magnetic disk 16 is also achieved by relative movement between the outer cover 14 and the plate 23 coupled with each other through the springs 37. Therefore, the structure to cause such operation is also made simpler leading likewise to simplified assembly work therefor. Furthermore, the operation to mount the magnetic disk 16 in place as described above is achieved by once rotating the outer cover 14 to the maximum limit and then allowing the outer cover 14 to be clamped, and so the operability therefor is made better. In addition, the number of required parts can be decreased and therefore both manufacturing cost and parts cost can be reduced.

What is claimed as new and desired to be secured by tters Patent of the United States is:

1. A magnetic disk driving device mprising:
   a base;
   disk supporting means pivotally attached at one side thereof to said base via a shaft for raising and lowering aid disk supporting means relative to said base;
   a spindle supported by said base for driving a magnetic disk supported by said disk supporting means;
   a magnetic head supported by said base by means for reciprocating said magnetic head in a radial direction of the magnetic disk supported by said disk supporting means;
   outer cover means pivotally attached to said base via said shaft such that said disk supported means is positioned between said base and said outer cover means;
   clamp means for clamping said uter cover means, when the outer cover means is moved to a position closest to said base, into a position wherein said outer cover means is slightly retreated from said position closest to the base;
   a plate elastically attached to a side of said outer cover means facing said disk supporting means;
   plate support means attached to said base for abutting said palte and fixing an opposition distance between said plate and said base;
   regulating means attached to said plate for regulating the rotating surface of the magnetic disk supported by said disk supporting means when said outer cover means is clamped by said clamp means;
   push members attached to said plate via a plate spring and facing a center portion of the magnetic disk supported by said disk supporting means with a small distance therebetween when saidplate is abutted on said plate support means; and
   spring support means attached to the interior of said outer cover means for pushing said plate spring, whereby said push members push the center portion of the magnetic disk supported by said disk supporting means when the outer cover means is in said position closest to said base, and whereby said push members retreat from the magnetic disk supported by said disk supporting means when said outer cover means is clamped.

2. A magnetic disk driving device according to claim 1, including a protruded piece formed on said outer cover means and a clamp claw rotatably attached to said base and engaged with said protruded piece when said protruded piece is rotated in a predetermined direction, said clamp having means, when said outer cover means is in said position closest to said base, for rotating in a direction to be disengage from said protruded piece, and also having means for rotating in direction to be engaged with said protruded piece.

3. A magnetic disk driving device ccording to claim i, including springs between said outer cover and said plate.

4. A magnetic disk driving device according to claim 1, wherein said push members comprise means to cause the spindle to fit in the center portion of the magnetic disk supported by said disk supporting means and push portions on the magnetic disk supported by said disk supporting means at positions disposed opposite to each other with said spindle between.

5. A magnetic disk driving device according to claim 1, including means for urging said outer cover means in the direction away from said base.

* * * * *